United States Patent

Nakata

Patent Number: 6,100,498
Date of Patent: Aug. 8, 2000

[54] METHOD OF REDUCING TIME FOR LASER PIERCING AND CUTTING

[75] Inventor: Yoshinori Nakata, Minamitsuru-gun, Japan

[73] Assignee: Fanuc Ltd., Yamanashi, Japan

[21] Appl. No.: 08/432,131

[22] PCT Filed: Sep. 7, 1994

[86] PCT No.: PCT/JP94/01480

§ 371 Date: May 8, 1995

§ 102(e) Date: May 8, 1995

[87] PCT Pub. No.: WO95/09066

PCT Pub. Date: Apr. 6, 1995

[30] Foreign Application Priority Data

Sep. 27, 1993 [JP] Japan .................................... 5-239462

[51] Int. Cl.[7] .................................................. B23K 26/00
[52] U.S. Cl. .............................. 219/121.72; 219/121.61; 219/121.71
[58] Field of Search ........................... 219/121.67, 121.7, 219/121.71, 121.72, 121.85, 121.61; 364/474.08

[56] References Cited

U.S. PATENT DOCUMENTS

| 5,252,805 | 10/1993 | Nakata et al. ..................... 219/121.72 |
| 5,444,211 | 8/1995 | Nakata et al. ..................... 219/121.67 |

FOREIGN PATENT DOCUMENTS

| 63-295085 | 12/1988 | Japan . |
| 3-118989 | 5/1991 | Japan . |
| 3-146288 | 6/1991 | Japan ................................. 219/121.7 |
| 3-210983 | 9/1991 | Japan ................................. 219/121.7 |
| 3-230884 | 10/1991 | Japan ................................. 219/121.7 |
| 5-185261 | 7/1993 | Japan ................................. 219/121.7 |

*Primary Examiner*—Geoffrey S. Evans
*Attorney, Agent, or Firm*—Staas & Halsey

[57] ABSTRACT

A piercing control method is provided to reduce the time required for piercing operation by a laser beam is made substantially zero. When a previous cutting operation is completed, a machining head is subjected to motion control so as to be moved to a subsequent cutting start point, and when the start of deceleration at $t_2$ is detected, a piercing start position is obtained. Specifically, using a set distance previously stored in memory, the piercing start position is set at a position which is advanced from the deceleration start position by the set distance. When the machining head reaches the piercing start position at time $t_4$ during the deceleration, a laser beam output command is issued to start the piercing from this point of time. The piercing is completed at time $t_5$ simultaneously with completion of positioning at the cutting start point. Simultaneously with completion of the piercing at time $t_5$, the subsequent cutting operation is started. Accordingly, the time required for the piercing can be made substantially zero, making it possible to reliably shorten the machining time.

4 Claims, 6 Drawing Sheets

METHOD OF REDUCING TIME FOR LASER PIERCING AND CUTTING

TECHNICAL FIELD

The present invention relates to a piercing control method for controlling piercing during cutting operation by means of a laser beam, and more particularly, to a piercing control method for controlling a piercing start time.

BACKGROUND ART

In general, when cutting a metal or the like by using a laser beam, piercing is carried out at an initial cutting start point. The piercing is performed by irradiating a laser beam after a machining head is accurately placed at a piercing position.

FIG. 6 is a diagram illustrating the conventional piercing control mentioned above. In the figure, the horizontal axis indicates time t and the vertical axis indicates the speed V of movement of the machining head. After a previous cutting operation is completed, the machining head is accelerated from time $t_0$ to time $t_{10}$, then moved at a fixed speed from time $t_{10}$ to time $t_{20}$, and decelerated from time $t_{20}$ to time $t_{30}$, so as to be moved to the next cutting start point. Subsequently, positioning at the cutting start point is checked during a time period $t_{30}$–$t_{40}$, and when the positioning completion is confirmed at time $t_{40}$, piercing is carried out at that position. Simultaneously with completion of the piercing at time $t_{50}$, the subsequent cutting operation is started. The interval $t_0$–$t_{40}$ is a time period during which the machining head is moved to the next machining start point, the interval $t_{40}$–$t_{50}$ is a time period for the piercing, and the cutting time period starts from $t_{50}$.

Thus, the conventional piercing requires the time period $t_{30}$–$t_{40}$ for confirmation of the positioning completion after deceleration according to motion control is ended.

Piercing is a machining operation executed at a start point for pre-machining within a portion that is irrelevant to the final shape of products, and accordingly, the piercing position need not be strictly set.

However, since the positioning for piercing is carried out with accuracy, as described above, the positioning requires the considerable time $t_{30}$–$t_{40}$, which is not negligible in cases where shorter machining time is demanded.

DISCLOSURE OF THE INVENTION

The present invention was created in view of the above circumstances, and an object thereof is to provide a piercing control method by which the time period required for piercing can be made substantially zero.

To achieve the above object, the present invention provides a piercing control method for controlling piercing during a cutting operation by means of a laser beam, wherein a laser output command for the piercing is issued upon lapse of a predetermined time after a deceleration start time during motion control of a machining head executed from a cutting end position to a subsequent cutting start position.

The machining head is subjected to the motion control from a cutting end position to a subsequent cutting start position. The laser output command for the piercing is issued upon passage of a predetermined distance from the deceleration start position during the motion control.

BEST MODE OF CARRYING OUT THE INVENTION

Embodiments according to the present invention will be hereinafter described with reference to the drawings.

Figure 2:
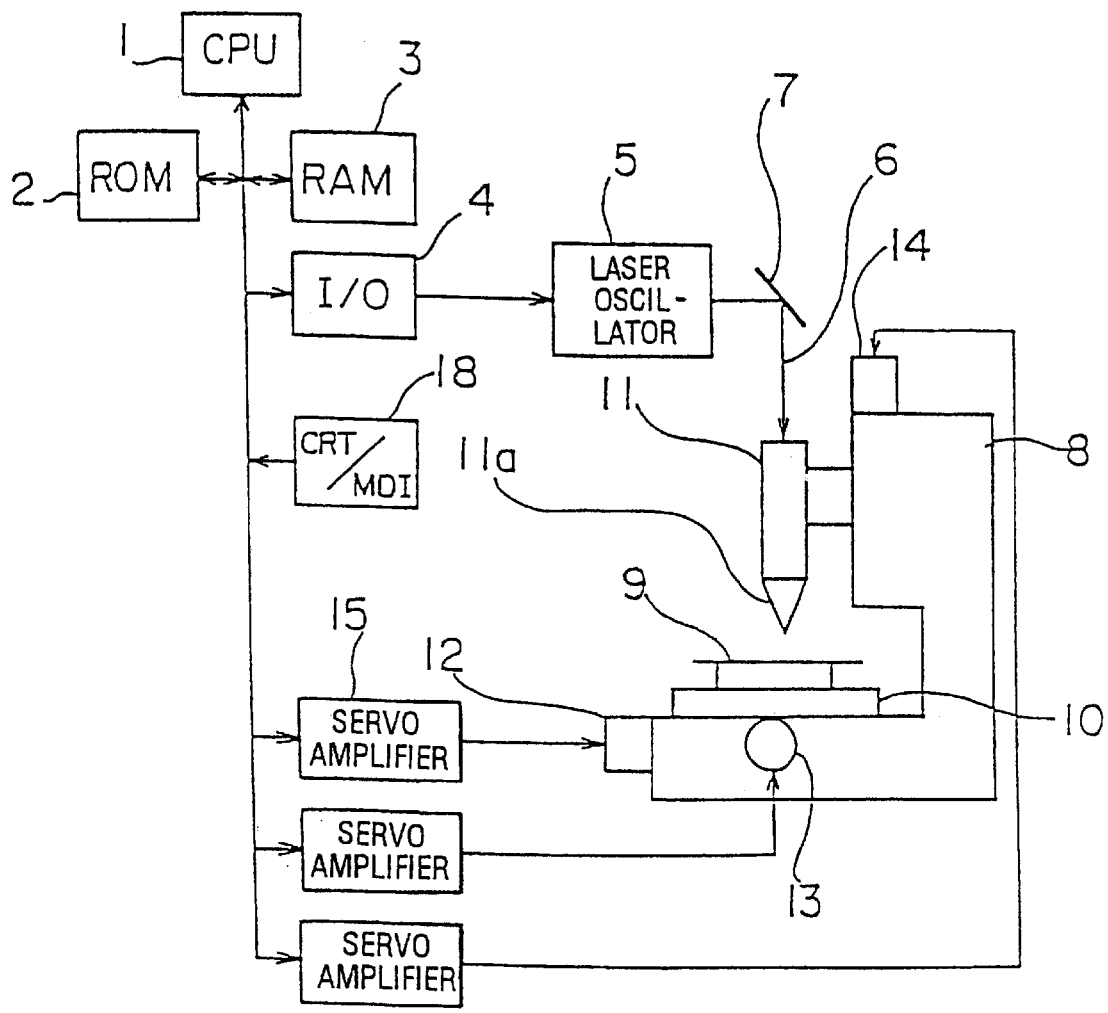
FIG. 2 is a block diagram of an NC laser device to which the piercing control method of the present invention is applied.

FIG. 2 is a block diagram of an NC laser device to which a piercing control method according to the present invention is applied. A processor 1 reads a machining program stored in a memory (RAM) 3 and controls the entire operation of the NC laser device, in accordance with a control program stored in a ROM 2. A program for carrying out the present invention and parameters such as a set distance or a set time are stored in this memory 3, as described in detail later. An I/O unit 4 converts a control signal from the processor 1 and supplies the converted signal to a laser oscillator 5. In accordance with the converted control signal, the laser oscillator 5 emits a pulsed laser beam 6. The laser beam 6 is reflected at a bending mirror 7 and introduced into a laser beam machine 8.

The laser beam machine 8 comprises a table 10 for fixing a workpiece 9 thereon, and a machining head 11 for irradiating the laser beam onto the workpiece 9. The laser beam 6 introduced into the machining head 11 is focused by a nozzle 11a and then irradiated onto the workpiece 9. The laser beam machine 8 is also provided with servomotors 12 and 13 for controlling movement of the table 10 in directions of X and Y axes, respectively, and a servomotor 14 for controlling the vertical movement of the machining head 11. These servomotors 12, 13 and 14 are connected to servo amplifiers 15, 16 and 17, respectively, and rotations thereof are controlled in accordance with axis control signals from the processor 1. Instructions to the laser beam machine 8 are given via a CRT/MDI unit 18.

The piercing control method executed by the NC laser device having the above-described arrangement will be now described.

Figure 1:
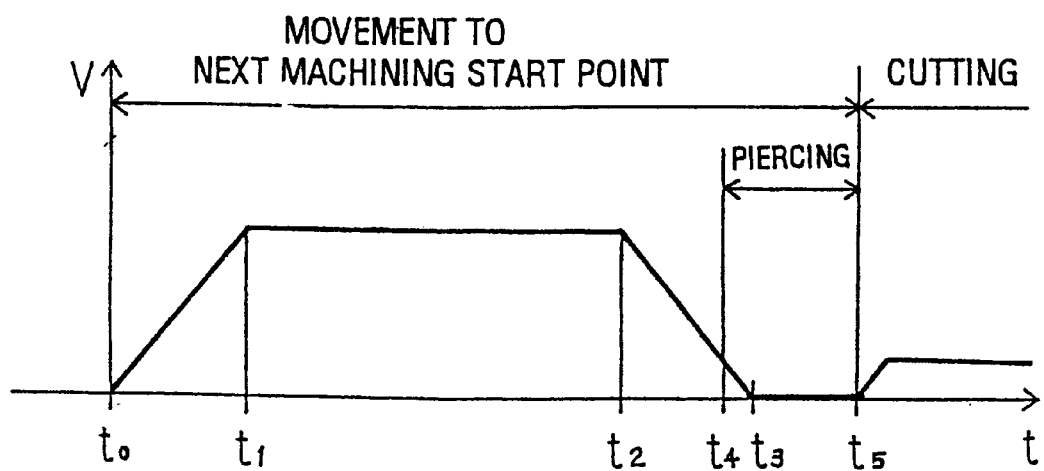
FIG. 1 is a diagram illustrating a piercing control method according to the present invention.

FIG. 1 is a diagram illustrating the piercing control method according to the present invention. In the figure, the horizontal axis indicates time t and the vertical axis indicates the speed V of motion of the machining head. After a previous cutting operation is completed, the machining head 11 is accelerated from time $t_0$ to time $t_1$, then moved at a fixed speed from time $t_1$ to time $t_2$, and decelerated from time $t_2$ to time $t_3$, so that the machining head 11 is moved to a subsequent cutting start point. Then, positioning at the cutting start point is checked during a time period $t_3$–$t_5$.

On the other hand, when the start of deceleration at $t_2$ is detected, a piercing start position is obtained. Specifically, using a set distance previously stored in the memory 3, the piercing start position is set at a position which is advanced from the deceleration start position by the set distance. The set distance is set such that the piercing is completed simultaneously with completion of the positioning completion at the cutting start point.

When the machining head 11 reaches the piercing start position at time $t_4$ during the deceleration, a laser beam output command is simultaneously issued to start the piercing. As mentioned above, the piercing is completed at time $t_5$ at which the positioning at the cutting start point is also completed. Simultaneously with completion of the piercing at $t_5$, the subsequent cutting operation is started. Accordingly, the time period $t_0$–$t_5$ is the period during which the machining head is moved to the subsequent machining start point, the time period $t_4$–$t_5$ is the piercing period, and the subsequent cutting period starts from $t_5$.

Thus, in this embodiment, the timing for the instruction to start the piercing is optimized such that the piercing is started before the positioning to the cutting start point is completed and is completed simultaneously with completion of the positioning. Namely, the time period required for confirmation of the positioning completion is effectively utilized in such a way that the piercing is completed within this time period. Accordingly, the time required for the piercing can be made substantially zero, making it possible to reliably shorten the machining time.

The piercing may be started before the deceleration of the machining head 11 ends. Even in such a case, the objective of piercing to cut a hole at the cutting start point can be fully accomplished. This is because piercing is a machining operation executed at a start point for pre-machining within a portion that is irrelevant to the final shape of products, and accordingly, the piercing position need not be set with high accuracy.

The advantage of making the piercing time substantially zero is particularly noticeable in the case of thin sheet metal cutting in which the time required for the piercing accounts for a large percentage of the total machining time.

Figure 3:
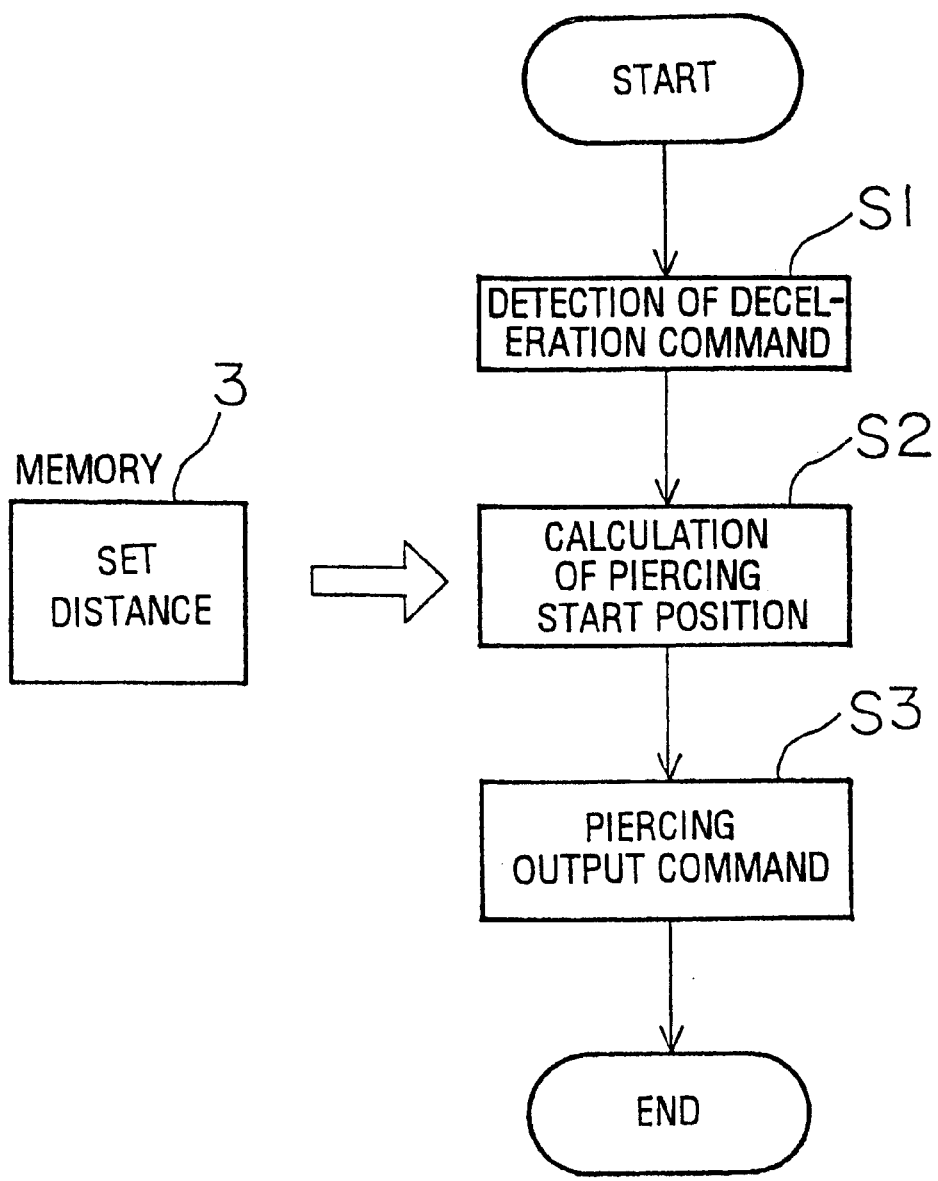
FIG. 3 is a flowchart of a process for carrying out the present invention.

FIG. 3 is a flowchart of a process for carrying out the present invention. In the chart, the numbers following "S" denote step numbers.

[S1] During control of the movement to a subsequent cutting start point after completion of a previous cutting operation, a deceleration command is detected.

[S2] When the start of deceleration is detected, the piercing start position is obtained. Specifically, using the set distance previously stored in the memory 3, the piercing start position is set at a position which is advanced from the deceleration start position by the set distance. The set distance is set such that the piercing is completed simultaneously with completion of the positioning at the cutting start point.

[S3] When the machining head 11 reaches the piercing start position, a laser beam output command is issued to carry out the piercing.

A second embodiment of the present invention will be described with reference to FIG. 4.

Figure 4:
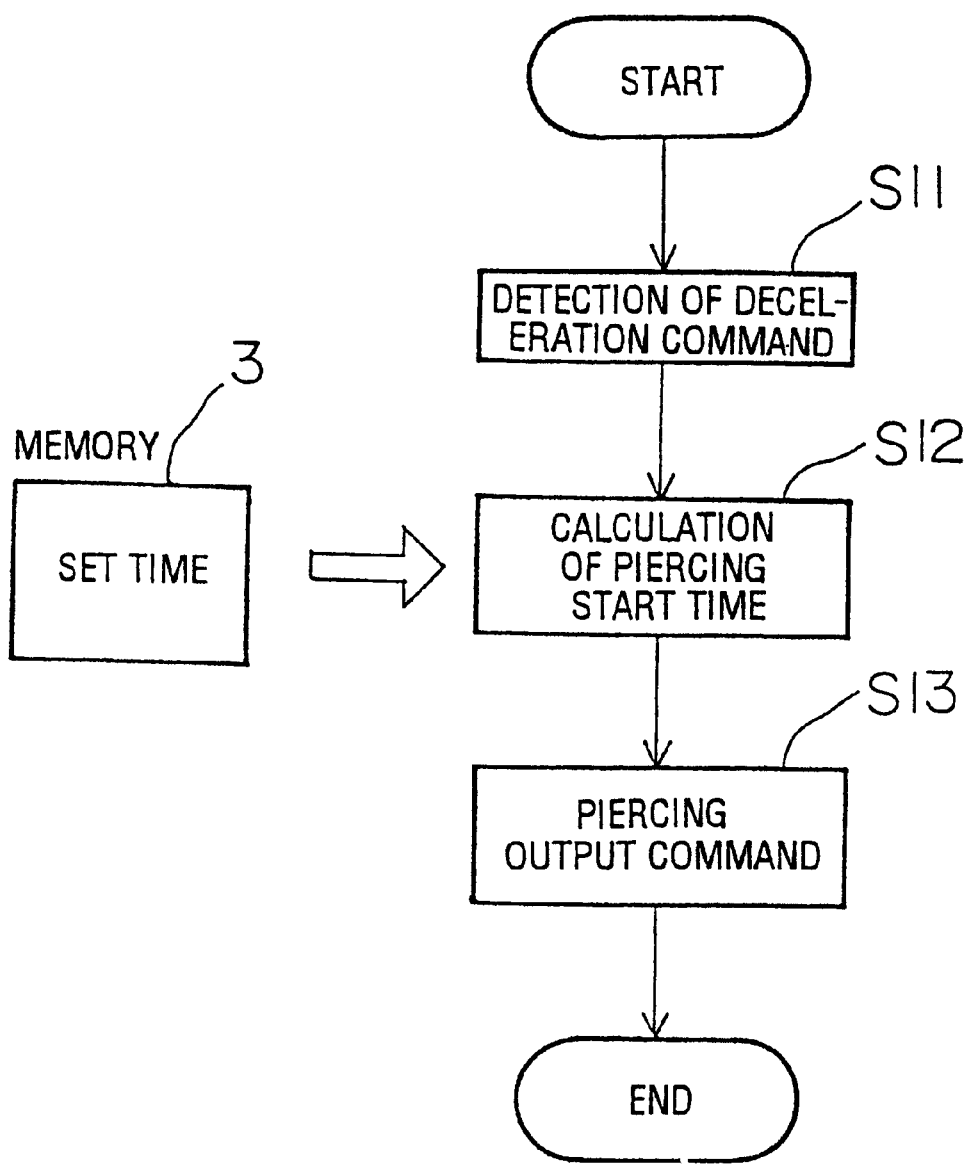
FIG. 4 is a flowchart of a process for carrying out a second embodiment of the present invention.

FIG. 4 is a flowchart of a process for carrying out the second embodiment of the present invention. This embodiment differs from the above first embodiment in that the timing for the instruction to start the piercing is calculated using a set time.

[S11] During the control of movement to a subsequent cutting start point after completion of a previous cutting operation, a deceleration command is detected.

[S12] When the start of deceleration is detected, the piercing start position is obtained. Specifically, using a set time period previously stored in the memory 3, a piercing start time is set at a point of time which is later than the deceleration start time by the set time period. The set time period is set such that the piercing is completed simultaneously with completion of the positioning at the cutting start point.

[S13] When time t reaches the piercing start time during the deceleration of the machining head 11, a laser beam output command is issued to carry out the piercing.

A third embodiment according to the present invention will be now described with reference to FIG. 5.

Figure 5:
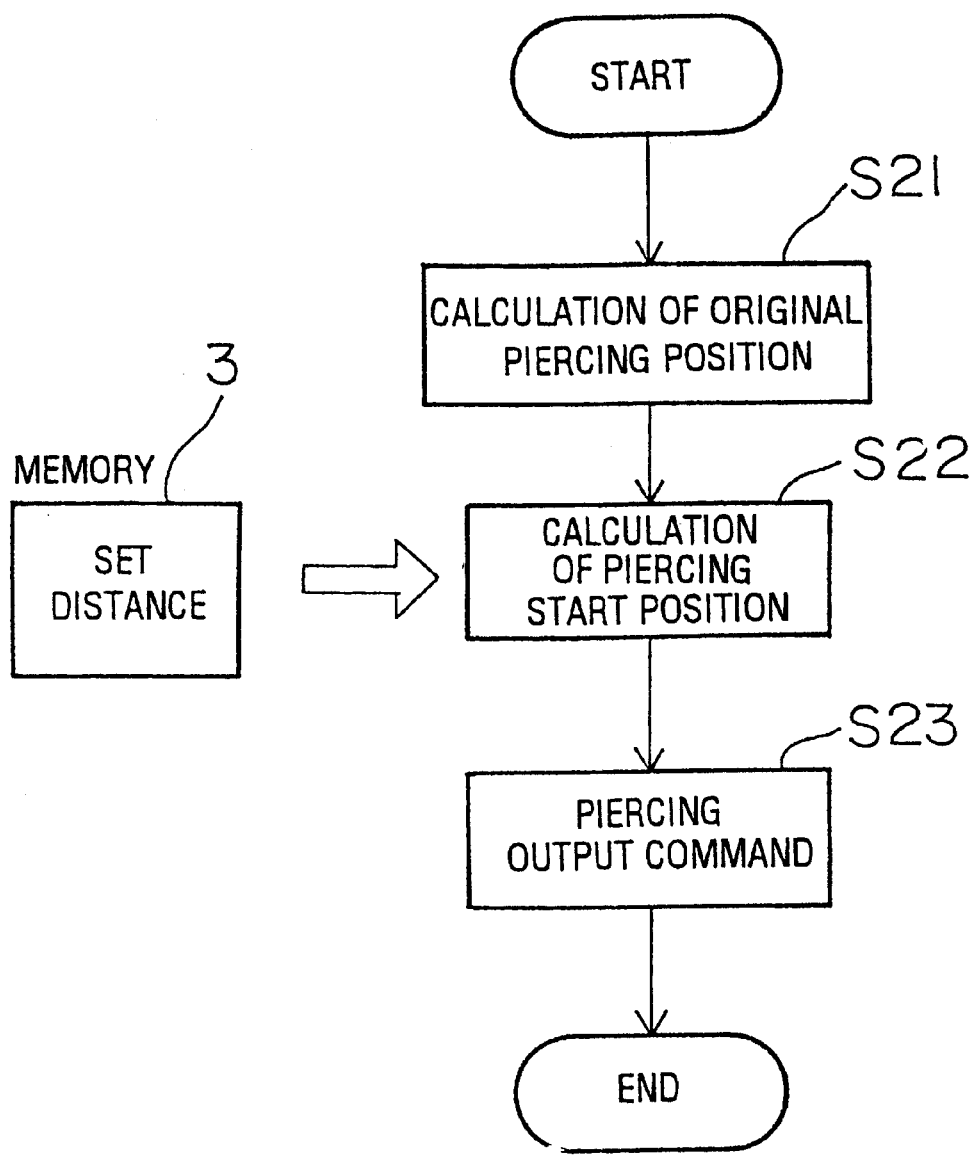
FIG. 5 is a flowchart of a process for carrying out a third embodiment of the present invention.
Figure 6:
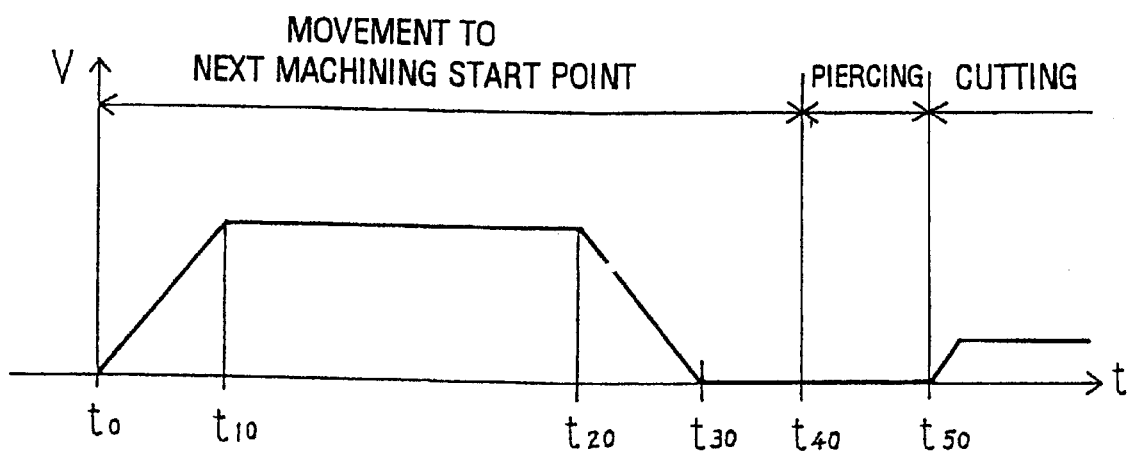
FIG. 6 is a diagram illustrating conventional piercing control.

FIG. 5 is a flowchart of a process for carrying out the third embodiment of the present invention. This embodiment differs from the first embodiment in that the timing for the instruction to start the piercing is calculated by inverse operation based on the cutting start position.

[S21] Look-ahead reading of the machining program is carried out to obtain the cutting start position (original piercing position).

[S22] The piercing start position is obtained by inverse operation based on the cutting start position. Specifically, the piercing start position is obtained by subtracting a set distance previously stored in the memory 3 from the cutting start position. The set distance is set such that the piercing is completed simultaneously with completion of the positioning at the cutting start point.

[S23] When the machining head 11 reaches the piercing start position, a laser beam output command is issued to carry out the piercing.

Thus, in this embodiment, the timing for the instruction to start the piercing is calculated by inverse operation based on the cutting start position, whereby both the time of completion of the confirmation of the positioning completion at the cutting start point and the time of completion of the piercing can be controlled with higher accuracy.

As described above, according to the present invention, during the motion control of the machining head executed from the cutting end position to the subsequent cutting start position, the laser output command for the piercing is issued when the machining head has traveled the predetermined distance from the deceleration start position. Accordingly, the time period required for confirming the positioning completion at the cutting start point is effectively utilized in such a way that the piercing is completed within this time period. Consequently, the time required for the piercing can be made substantially zero, making it possible to reliably shorten the machining time.

The advantage of making the piercing time substantially zero is particularly noticeable in the case of sheet metal cutting in which the time required for the piercing accounts for a large percentage of the total machining time.

I claim:

1. A piercing control method for controlling piercing during a cutting operation by means of a laser beam, wherein a laser output command for the piercing is issued upon passage of a predetermined distance from a deceleration start during motion control executed from a cutting end position to a subsequent cutting start position.

2. The piercing control method according to claim 1, wherein the piercing is completed simultaneously with or before completion of positioning of a machining head by the motion control.

3. A piercing control method for controlling piercing during a cutting operation by means of a laser beam, wherein a laser output command for the piercing is issued upon lapse of a predetermined time period after a deceleration start time during motion control of a machining head executed from a cutting end position to a subsequent cutting start position.

4. A piercing control method for controlling piercing during a cutting operation by means of a laser beam, wherein a laser beam output command for the piercing is issued at a position which is a predetermined distance short of a cutting start position obtained by looked-ahead reading of a machining program.

* * * * *